US010079026B1

(12) United States Patent
Ebenezer

(10) Patent No.: US 10,079,026 B1
(45) Date of Patent: Sep. 18, 2018

(54) SPATIALLY-CONTROLLED NOISE REDUCTION FOR HEADSETS WITH VARIABLE MICROPHONE ARRAY ORIENTATION

(71) Applicant: Cirrus Logic International Semiconductor Ltd., Edinburgh (GB)

(72) Inventor: Samuel P. Ebenezer, Tempe, AZ (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/827,160

(22) Filed: Nov. 30, 2017

Related U.S. Application Data

(60) Provisional application No. 62/549,289, filed on Aug. 23, 2017.

(51) Int. Cl.

| | |
|---|---|
| ***H04B 15/00*** | (2006.01) |
| ***G10L 21/0208*** | (2013.01) |
| ***H04R 1/10*** | (2006.01) |
| ***G10L 25/78*** | (2013.01) |
| ***G10K 11/175*** | (2006.01) |
| ***H04R 25/00*** | (2006.01) |

(52) U.S. Cl.
CPC ........ *G10L 21/0208* (2013.01); *G10K 11/175* (2013.01); *G10L 25/78* (2013.01); *H04R 1/1083* (2013.01); *H04R 25/43* (2013.01)

(58) Field of Classification Search
CPC ... G10L 21/0208; G10L 25/78; G10K 11/175; H04R 1/1083; H04R 25/43
See application file for complete search history.

(56) References Cited

U.S. PATENT DOCUMENTS

| | | | | |
|---|---|---|---|---|
| 7,953,596 | B2 * | 5/2011 | Pinto | G10L 21/0208 381/71.1 |
| 8,565,446 | B1 | 10/2013 | Ebenezer | |
| 2011/0305345 | A1 * | 12/2011 | Bouchard | G10L 21/0208 381/23.1 |

* cited by examiner

*Primary Examiner* — Andrew L Sniezek
(74) *Attorney, Agent, or Firm* — Jackson Walker L.L.P.

(57) ABSTRACT

A method may include determining a desired speech estimate originating from a speech acceptance direction range while reducing a level of interfering noise, determining an interfering noise estimate originating from a noise rejection direction range while reducing a level of desired speech, calculating a ratio of the desired speech estimate to the interfering noise estimate, dynamically computing a set of thresholds based on the speech acceptance direction range, noise rejection direction range, a background noise level, and a noise type, estimating a power spectral density of background noise arriving from the noise rejection direction range, calculating a frequency-dependent gain function based on the power spectral density of background noise and thresholds, and applying the frequency-dependent gain function to at least one microphone signal generated by the plurality of microphones to reduce noise arriving from the noise rejection direction while preserving desired speech arriving from the speech acceptance direction.

22 Claims, 16 Drawing Sheets

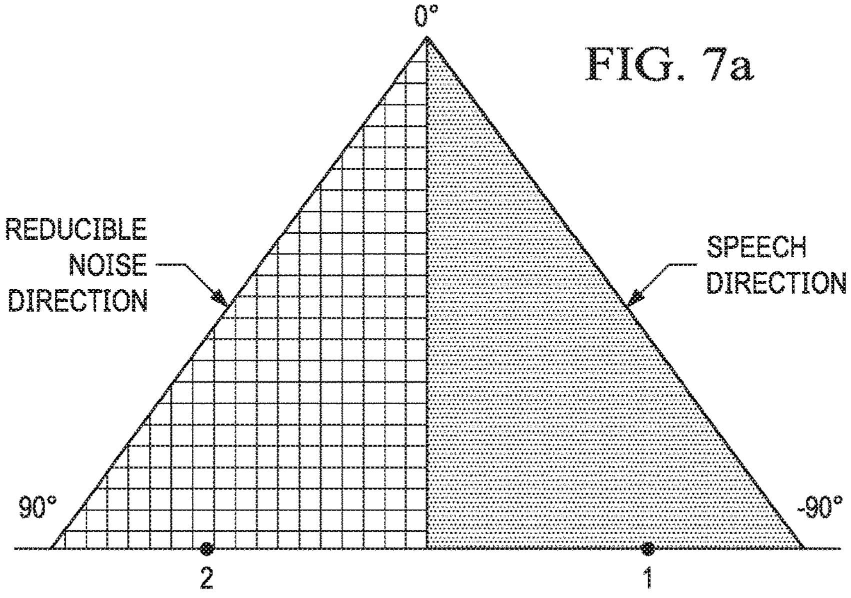
FIG. 7a
FIG. 7b
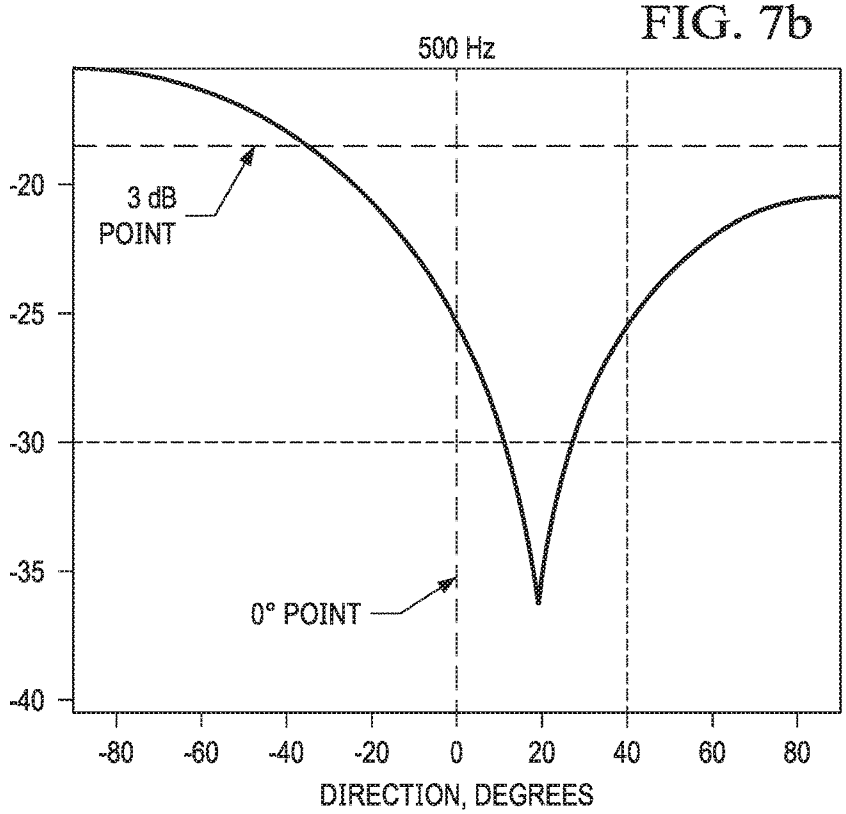

SPATIALLY-CONTROLLED NOISE REDUCTION FOR HEADSETS WITH VARIABLE MICROPHONE ARRAY ORIENTATION

RELATED APPLICATION

The present disclosure claims priority to U.S. Provisional Patent Application Ser. No. 62/549,289, filed Aug. 23, 2017, which is incorporated by reference herein in its entirety.

TECHNICAL FIELD

The field of representative embodiments of this disclosure relates to methods, apparatuses, and implementations concerning or relating to voice applications in an audio device. Applications include dual microphone voice processing for headsets with a variable microphone array orientation relative to a source of desired speech.

BACKGROUND

Voice activity detection (VAD), also known as speech activity detection or speech detection, is a technique used in speech processing in which the presence or absence of human speech is detected. VAD may be used in a variety of applications, including noise suppressors, background noise estimators, adaptive beamformers, dynamic beam steering, always-on voice detection, and conversation-based playback management. Many voice activity detection applications may employ a dual-microphone-based speech enhancement and/or noise reduction algorithm, that may be used, for example, during a voice communication, such as a call. Most traditional dual microphone algorithms assume that an orientation of the array of microphones with respect to a desired source of sound (e.g., a user's mouth) is fixed and known a priori. Such prior knowledge of this array position with respect to the desired sound source may be exploited to preserve a user's speech while reducing interference signals coming from other directions.

Headsets with a dual microphone array may come in a number of different sizes and shapes. Due to the small size of some headsets, such as in-ear fitness headsets, headsets may have limited space in which to place the dual microphone array on an earbud itself. Moreover, placing microphones close to a receiver in the earbud may introduce echo-related problems. Hence, many in-ear headsets often include a microphone placed on a volume control box for the headset and a single microphone-based noise reduction algorithm is used during voice call processing. In this approach, voice quality may suffer when a medium to high level of background noise is present. The use of dual microphones assembled in the volume control box may improve the noise reduction performance. In a fitness-type headset, the control box may frequently move and the control box position with respect to a user's mouth may be at any point in space depending on user preference, user movement, or other factors. For example, in a noisy environment, the user may manually place the control box close to the mouth for increased input signal-to-noise ratio. In such cases, using a dual microphone approach for voice processing in which the microphones are placed in the control box may be a challenging task. As an example, a desired speech direction may not be constant such that user speech may be suppressed in many solutions, including those in which voice processing with beamformers is used.

SUMMARY

In accordance with the teachings of the present disclosure, one or more disadvantages and problems associated with existing approaches to noise reduction in headsets may be reduced or eliminated.

In accordance with embodiments of the present disclosure, a method for voice processing in an audio device having an array of a plurality of microphones wherein the array is capable of having a plurality of positional orientations relative to a user of the array, is provided. The method may include determining a desired speech estimate originating from a speech acceptance direction range of a speech acceptance direction while reducing a level of interfering noise, determining an interfering noise estimate originating from a noise rejection direction range of a noise rejection direction while reducing a level of desired speech, calculating a ratio of the desired speech estimate to the interfering noise estimate, dynamically computing a set of thresholds based on the speech acceptance direction range, noise rejection direction range, a background noise level, and a noise type, estimating a power spectral density of background noise arriving from the noise rejection direction range, calculating a frequency-dependent gain function based on the power spectral density of background noise and thresholds, and applying the frequency-dependent gain function to at least one microphone signal generated by the plurality of microphones to reduce noise arriving from the noise rejection direction while preserving desired speech arriving from the speech acceptance direction.

In accordance with these and other embodiments of the present disclosure, an integrated circuit for implementing at least a portion of an audio device having an array of a plurality of microphones wherein the array is capable of having a plurality of positional orientations relative to a user of the array, may include a plurality of microphone inputs, each microphone input associated with one of the plurality of microphones, and a processor. The processor may be configured to determine a desired speech estimate originating from a speech acceptance direction range of a speech acceptance direction while reducing a level of interfering noise, determine an interfering noise estimate originating from a noise rejection direction range of a noise rejection direction while reducing a level of desired speech, calculate a ratio of the desired speech estimate to the interfering noise estimate, dynamically compute a set of thresholds based on the speech acceptance direction range, noise rejection direction range, a background noise level, and a noise type, estimate a power spectral density of background noise arriving from the noise rejection direction range, calculate a frequency-dependent gain function based on the power spectral density of background noise and thresholds, and apply the frequency-dependent gain function to at least one microphone signal generated by the plurality of microphones to reduce noise arriving from the noise rejection direction while preserving desired speech arriving from the speech acceptance direction.

Technical advantages of the present disclosure may be readily apparent to one of ordinary skill in the art from the figures, description, and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein:

FIG. 7(*a*) illustrates an example required speech acceptance range that encompasses multiple possible array orientations for the fitness headset shown in FIG. 5, in accordance with embodiments of the present disclosure;

FIG. 7(*b*) illustrates an example angular response of a first order hyper-cardioid beamformer, in accordance with embodiments of the present disclosure;

FIG. 8(*b*) illustrates an example speech beampattern for noise beamformer corresponding to the directional ranges shown in FIG. 7(*a*), in accordance with embodiments of the present disclosure;

DETAILED DESCRIPTION

In this disclosure, systems and methods are proposed for non-linear beamforming based noise reduction in a dual microphone array that is robust to dynamic changes in desired speech arrival direction. The systems and methods herein may be useful in, among other applications, in-ear fitness headsets wherein the microphones are placed in a control box. In such headsets, the microphone array position with respect to a user's mouth varies significantly depending on the headset wearing preference of the user. Moreover, the microphone array orientation is not constant because head movements and obstructions from collared shirts and heavy jackets may prevent the control box from resting in a consistent position. Hence, the desired speech arrival direction is not constant in such configurations, and the systems and methods proposed herein may ensure that the user speech is preserved under various array orientation while improving the signal to noise ratio more than single microphone processing would. Specifically, given a pre-specified speech arrival direction range, the systems and methods disclosed herein may suppress interfering noise that arrives from directions outside of a speech arrival direction range. The systems and methods disclosed herein may also derive a statistic that estimates an interference to desired speech ratio and use this statistic to dynamically update a background noise estimate for a single channel spectral subtraction-based noise reduction algorithm. The aggressiveness of noise reduction may also be controlled based on the derived statistic. Ambient aware information such as a noise level and/or a noise type, (e.g., diffused or directional or uncorrelated noise) may also be used to appropriately control the background noise estimation process. The derived statistics may also be used to detect the presence of desired near-field signals. This signal detection may be used in various applications as described below.

Figure 1:
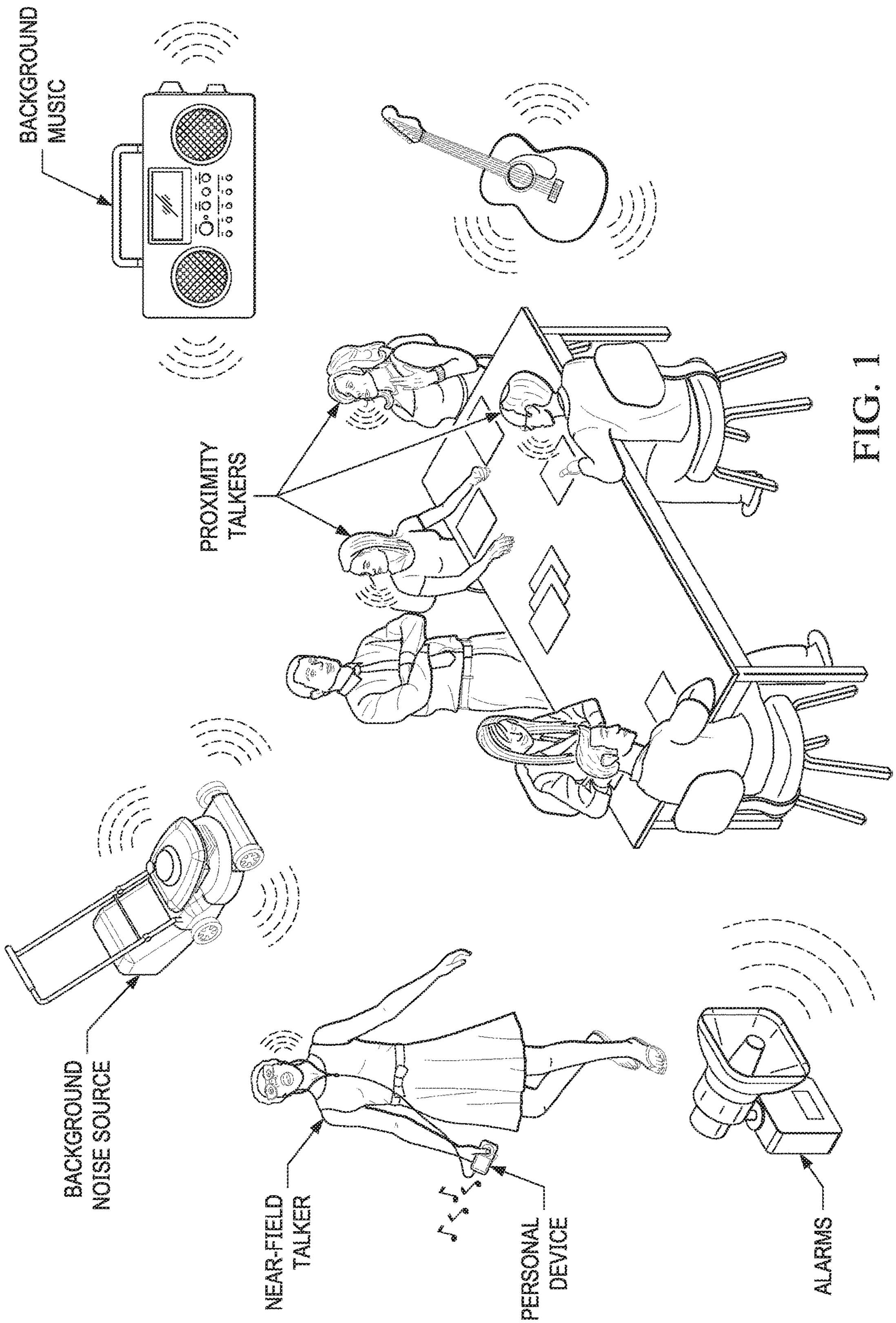
FIG. 1 illustrates an example of a use case scenario wherein various detectors may be used in conjunction with a playback management system to enhance a user experience, in accordance with embodiments of the present disclosure.

In accordance with embodiments of this disclosure, an automatic playback management framework may use one or more audio event detectors. Such audio event detectors for an audio device may include a near-field detector that may detect when sounds in the near-field of the audio device are detected, such as when a user of the audio device (e.g., a user that is wearing or otherwise using the audio device) speaks, a proximity detector that may detect when sounds in proximity to the audio device are detected, such as when another person in proximity to the user of the audio device speaks, and a tonal alarm detector that detects acoustic alarms that may have been originated in the vicinity of the audio device. FIG. 1 illustrates an example of a use case scenario wherein such detectors may be used in conjunction with a playback management system to enhance a user experience, in accordance with embodiments of the present disclosure.

Figure 2:
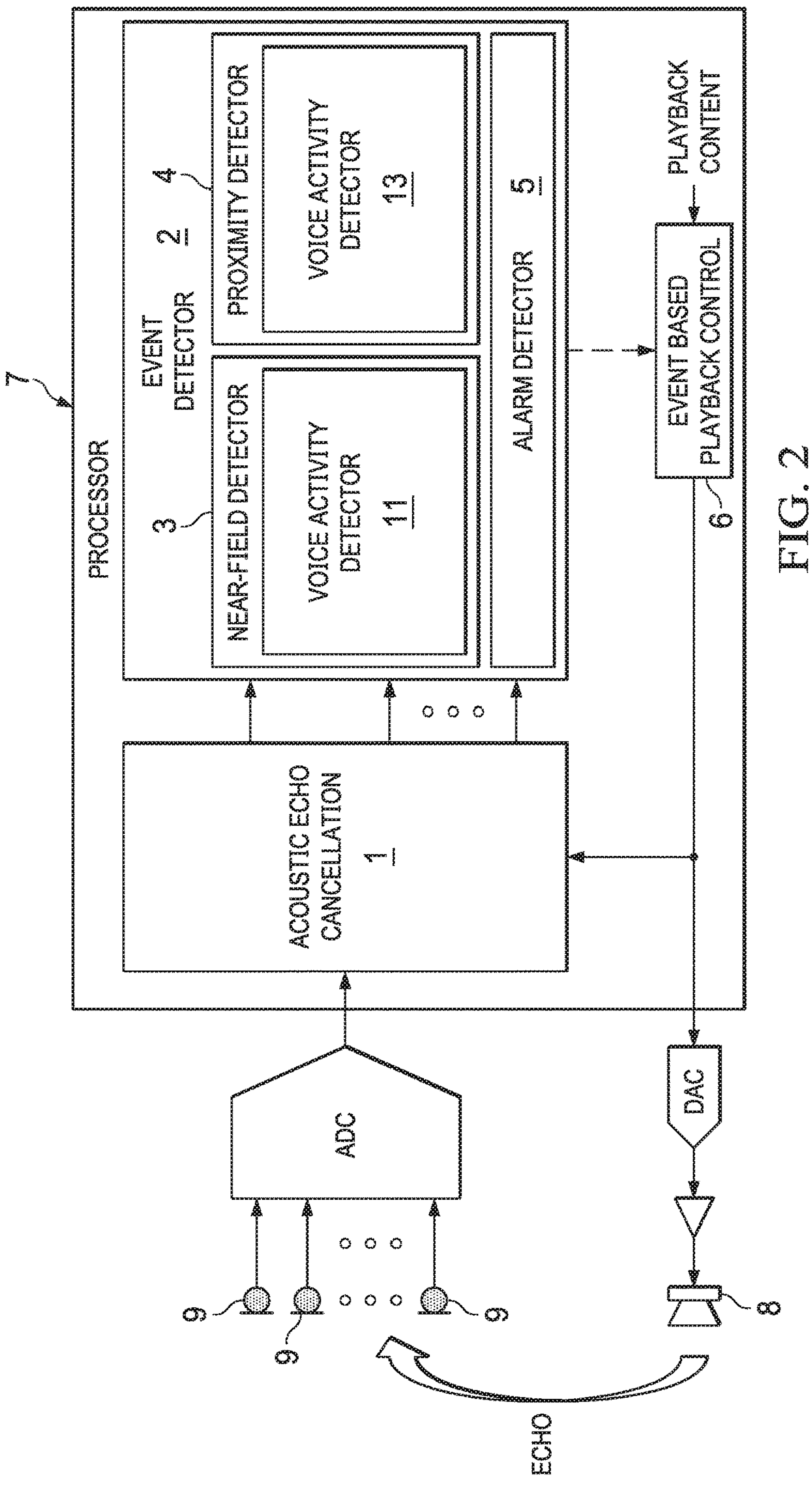
FIG. 2 illustrates an example playback management system, in accordance with embodiments of the present disclosure.

FIG. 2 illustrates an example playback management system that modifies a playback signal based on a decision from an event detector 2, in accordance with embodiments of the present disclosure. Signal processing functionality in a processor 7 may comprise acoustic echo canceller 1 that may cancel an acoustic echo that is received at microphones 9 due to an echo coupling between an output audio transducer 8 (e.g., loudspeaker) and microphones 9. The echo reduced signal may be communicated to event detector 2 which may detect one or more various ambient events, including without limitation a near-field event (e.g., including but not limited to speech from a user of an audio device) detected by near-field detector 3, a proximity event (e.g., including but not limited to speech or other ambient sound other than near-field sound) detected by proximity detector 4, and/or a tonal alarm event detected by alarm detector 5. If an audio event is detected, an event-based playback control 6 may modify a characteristic of audio information (shown as "playback content" in FIG. 2) reproduced to output audio transducer 8. Audio information may include any information that may be reproduced at output audio transducer 8, including without limitation, downlink speech associated with a telephonic conversation received via a communication network (e.g., a cellular network) and/or internal audio from an internal audio source (e.g., music file, video file, etc.).

As shown in FIG. 2, near-field detector 3 may include a voice activity detector 11 which may be utilized by near-field detector 3 to detect near-field events. Voice activity detector 11 may include any suitable system, device, or apparatus configured to perform speech processing to detect the presence or absence of human speech. In accordance with such processing, voice activity detector 11 may detect the presence of near-field speech.

As shown in FIG. 2, proximity detector 4 may include a voice activity detector 13 which may be utilized by proximity detector 4 to detect events in proximity with an audio device. Similar to voice activity detector 11, voice activity detector 13 may include any suitable system, device, or apparatus configured to perform speech processing to detect the presence or absence of human speech.

Figure 3:
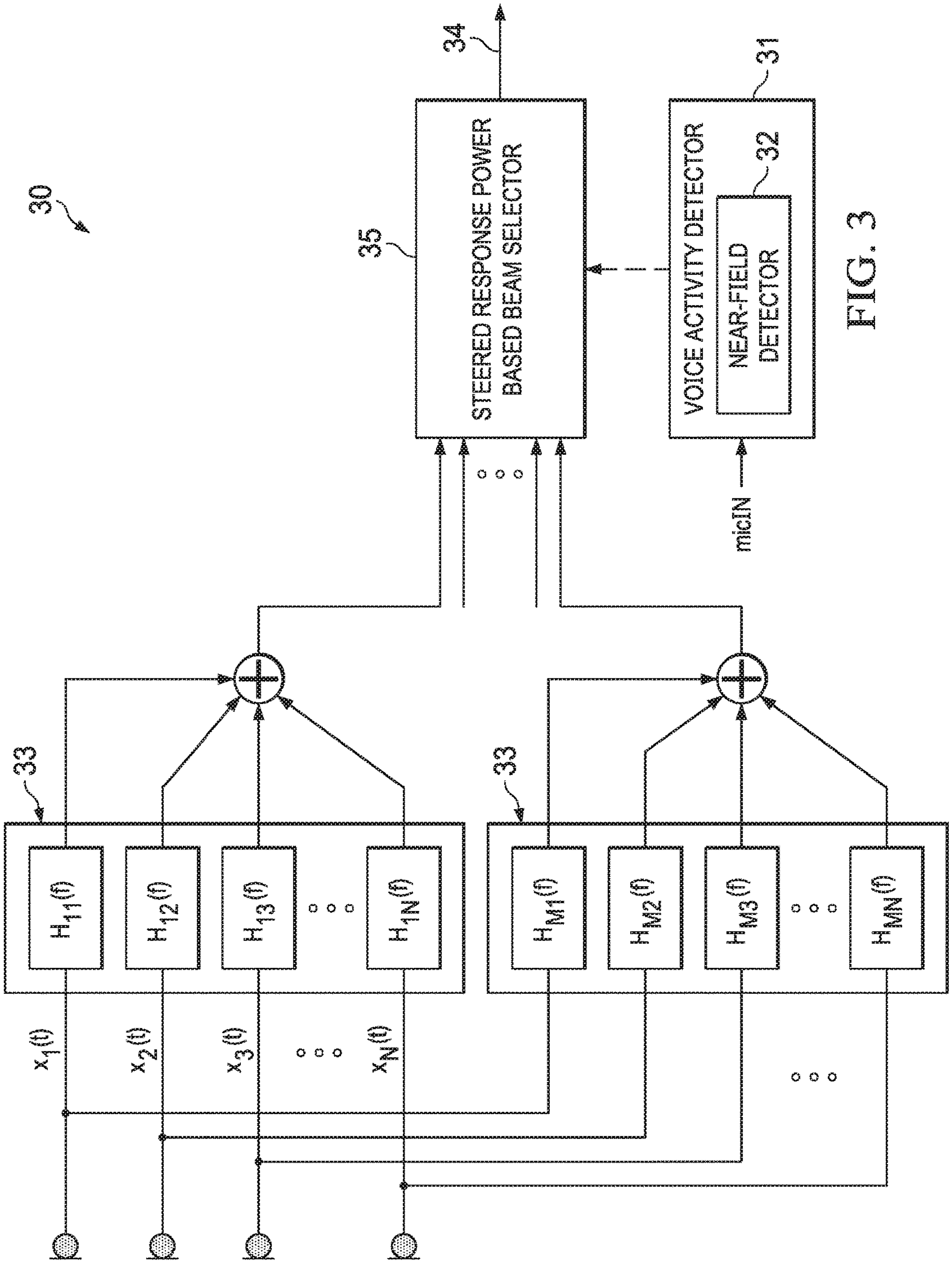
FIG. 3 illustrates an example steered response power based beamsteering system, in accordance with embodiments of the present disclosure.

FIG. 3 illustrates an example steered response power-based beamsteering system 30, in accordance with embodiments of the present disclosure. Steered response power-based beamsteering system 30 may operate by implementing multiple beamformers 33 (e.g., delay-and-sum and/or filter-and-sum beamformers) each with a different look direction such that the entire bank of beamformers 33 will cover the desired field of interest. The beamwidth of each beamformer 33 may depend on a microphone array aperture length. An output power from each beamformer 33 may be computed, and a beamformer 33 having a maximum output power may be switched to an output path 34 by a steered-response power-based beam selector 35. Switching of beam selector 35 may be constrained by a voice activity detector 31 having a near-field detector 32 such that the output power is measured by beam selector 35 only when speech is detected, thus preventing beam selector 35 from rapidly switching between multiple beamformers 33 by responding to spatially non-stationary background impulsive noises.

Figure 4:
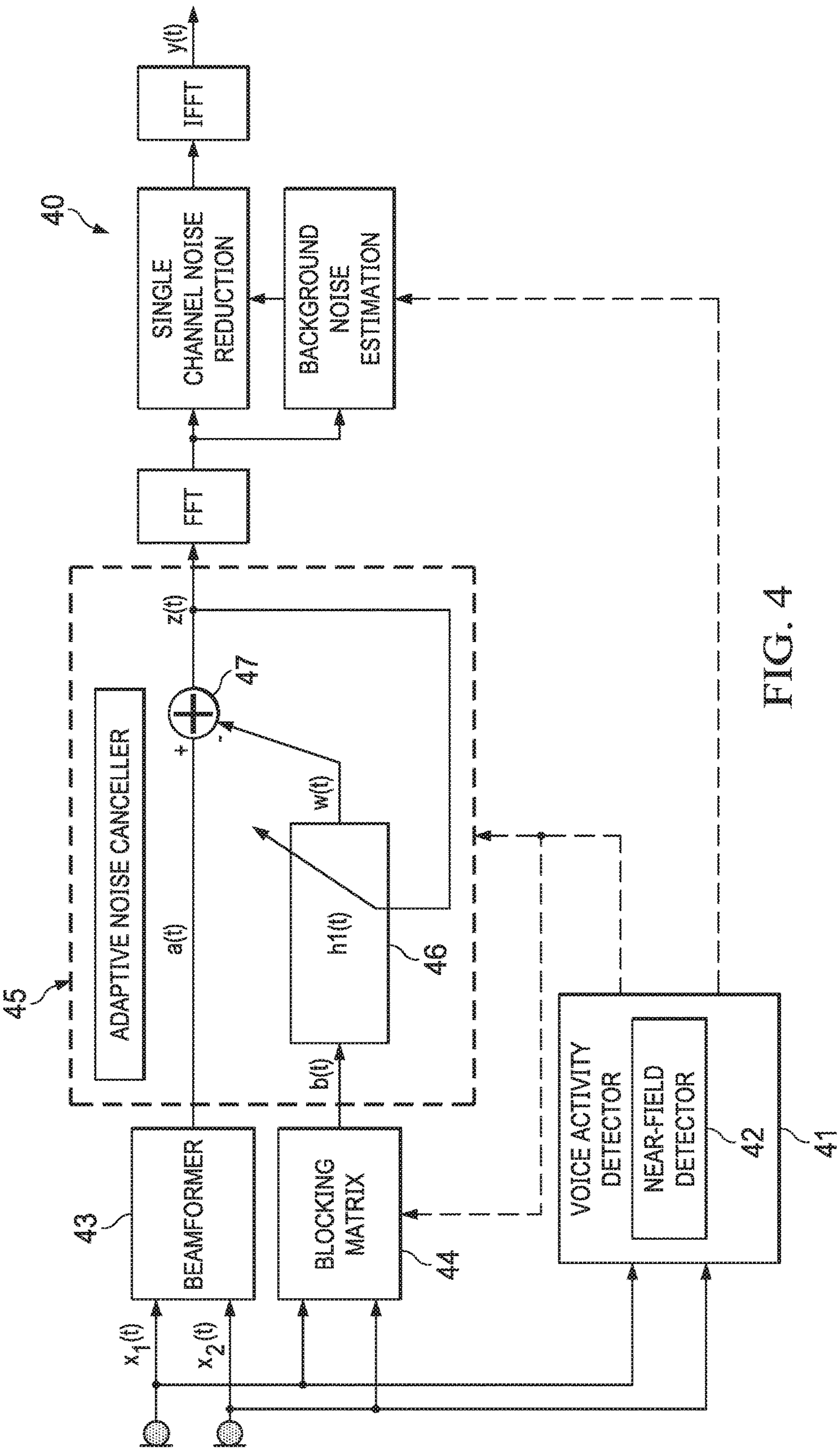
FIG. 4 illustrates an example adaptive beamformer, in accordance with embodiments of the present disclosure.

FIG. 4 illustrates an example adaptive beamformer 40, in accordance with embodiments of the present disclosure. Adaptive beamformer 40 may comprise any system, device, or apparatus capable of adapting to changing noise conditions based on received data. In general, an adaptive beamformer may achieve higher noise cancellation or interference suppression compared to fixed beamformers. As shown in FIG. 4, adaptive beamformer 40 is implemented as a generalized side lobe canceller (GSC). Accordingly, adaptive beamformer 40 may comprise a fixed beamformer 43, blocking matrix 44, and a multiple-input adaptive noise canceller 45 comprising an adaptive filter 46. If adaptive filter 46 were to adapt at all times, it may train to speech leakage also causing speech distortion during a subtraction stage 47. To increase robustness of adaptive beamformer 40, a voice activity detector 41 having a near-field detector 42 may communicate a control signal to adaptive filter 46 to disable training or adaptation in the presence of speech. In such implementations, voice activity detector 41 may control a noise estimation period wherein background noise is not estimated whenever speech is present. Similarly, the robustness of a GSC to speech leakage may be further improved by using an adaptive blocking matrix, the control for which may include an improved voice activity detector with an impulsive noise detector, as described in U.S. Pat. No. 9,607,603 entitled "Adaptive Block Matrix Using Pre-Whitening for Adaptive Beam Forming."

Figure 5:
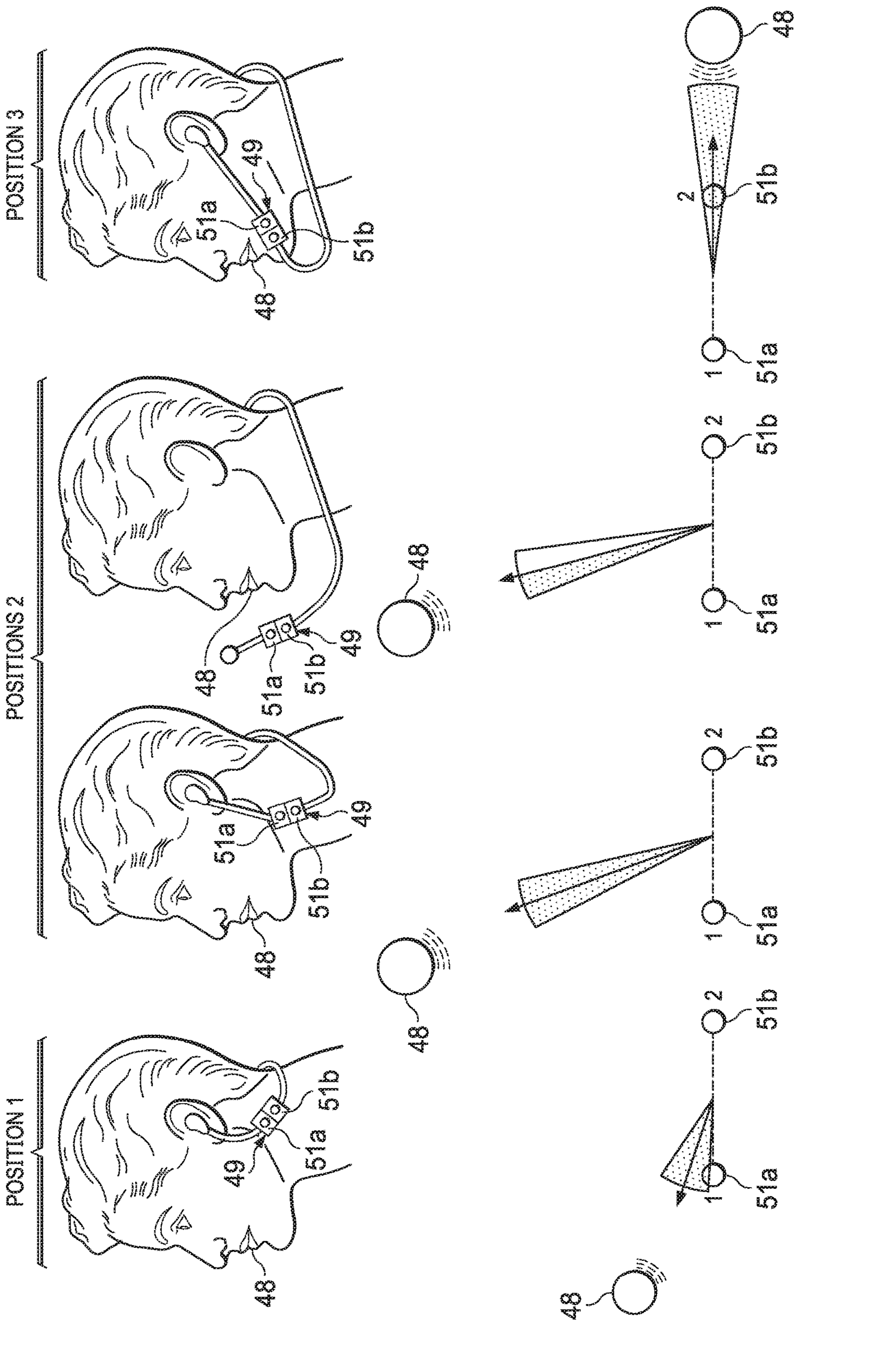
FIG. 5 illustrates a schematic showing a variety of possible orientations of microphones in a fitness headset, in accordance with embodiments of the present disclosure.

FIG. 5 illustrates a schematic showing a variety of possible orientations of microphones 51 (e.g., 51*a*, 51*b*) in a fitness headset 49 relative to a user's mouth 48, wherein the user's mouth is the desired source of voice-related sound, in accordance with embodiments of the present disclosure.

Figure 6:
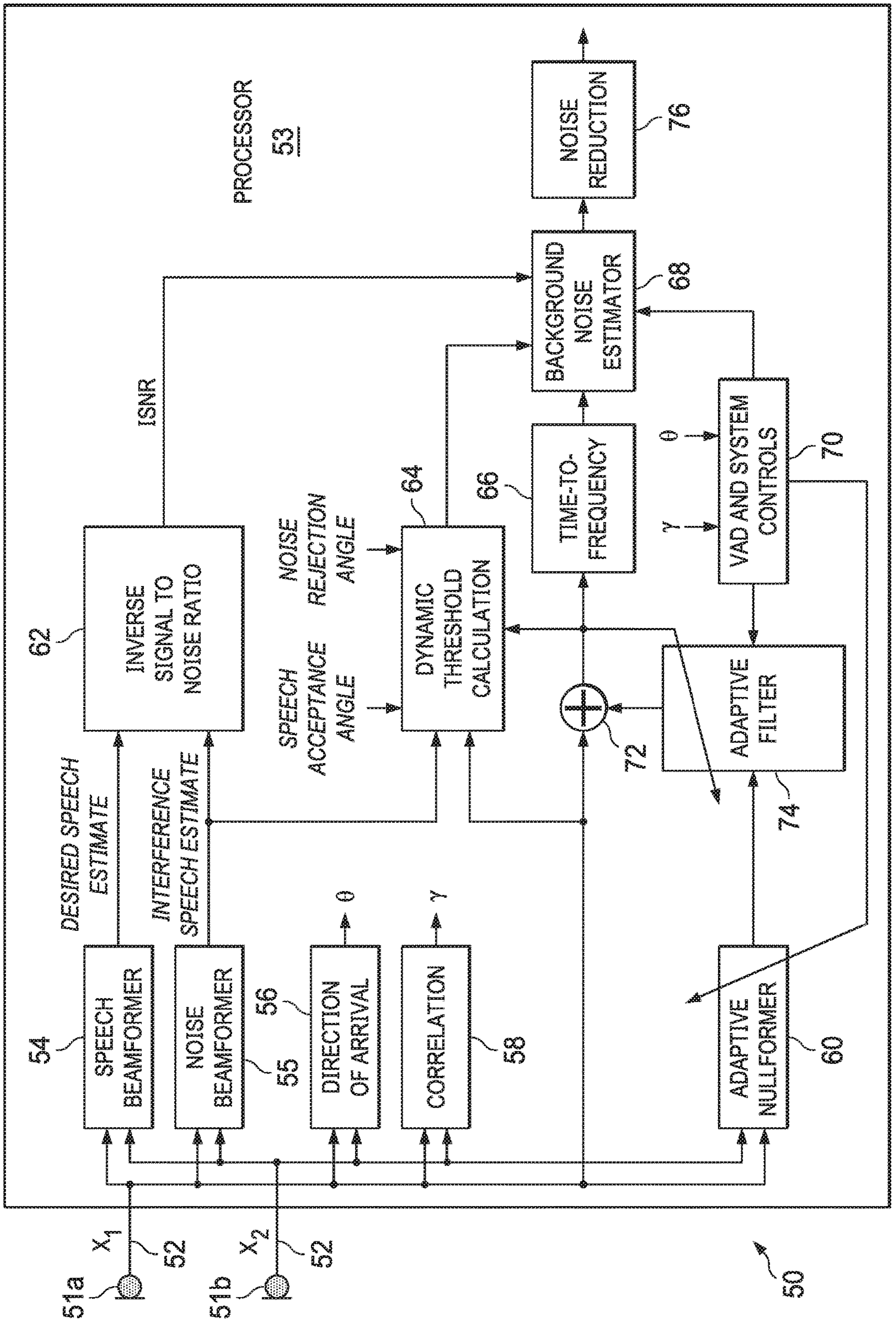
FIG. 6 illustrates a block diagram of selected components of an audio device for implementing dual-microphone voice processing for a headset with a variable microphone array orientation, in accordance with embodiments of the present disclosure.

FIG. 6 illustrates a block diagram of selected components of an audio device 50 for implementing dual-microphone voice processing for a headset with a variable microphone array orientation, in accordance with embodiments of the present disclosure. As shown, audio device 50 may include microphone inputs 52 and a processor 53. A microphone input 52 may include any electrical node configured to receive an electrical signal (e.g., $x_1$, $x_2$) indicative of acoustic pressure upon a microphone 51. In some embodiments, such electrical signals may be generated by respective microphones 51 located on a controller box (sometimes known as a communications box) associated with an audio headset. Processor 53 may be communicatively coupled to microphone inputs 52 and may be configured to receive the electrical signals generated by microphones 51 coupled to microphone inputs 52 and process such signals to perform voice processing, as further detailed herein. Although not shown for the purposes of descriptive clarity, a respective analog-to-digital converter may be coupled between each of the microphones 51 and their respective microphone inputs 52 in order to convert analog signals generated by such microphones into corresponding digital signals which may be processed by processor 53.

As shown in FIG. 6, processor 53 may implement a speech beamformer 54, a noise beamformer 55, a direction of arrival estimator 56, a correlation block 58, a nullformer 60, an inverse signal-to-noise ratio block 62, a dynamic threshold calculation block 64, a time-to-frequency converter 66, a background noise estimator 68, a voice activity detector (VAD) and system controls block 70, a combiner 72, an adaptive filter 74, and a noise reduction block 76.

As known in the art, a first-order beamformer is one that combines two microphone signals to form a virtual signal acquisition beam focused towards a desired look direction such that signals arriving from directions other than the look direction are attenuated. Typically, output signal-to-noise ratio of a beamformer is high due to the attenuation of signals arriving from directions other than the desired look direction. For example, FIG. 7(*a*) depicts an example required speech acceptance range that encompasses multiple possible array orientations for fitness headset 49, as shown in FIG. 5. FIG. 7(*b*) depicts an example angular response of a first order hyper-cardioid beamformer that has a six-decibel directivity index. Thus, for the acceptance angle given in FIG. 7(*a*), the beamformer in FIG. 7(*b*) with a maximum directivity index may suppress the desired speech by up to 10 dB. Hence, in the present application, the two microphone signals 52 are not combined as is typically done in many traditional approaches in order to form a beam towards a desired speech direction. Instead, one of the microphones is used as a voice microphone and a spatially-controlled signal microphone noise reduction method is used to enhance signal-to-noise ratio. Even though, using methods and systems disclosed herein, microphone signals 52 are not combined in an audio signal path, they are combined to derive spatial statistics (e.g., inverse signal-to-noise ratio, maximum normalized cross-correlation, and direction of arrival) which are then used by audio device 50 to suppress noise in a non-linear manner, as described in greater detail below.

In order to determine if desired speech is present in a speech acceptance angle, a spatial statistic may be derived by forming a set of fixed beamformers including speech beamformer 54 and noise beamformer 55. Speech beamformer 54 may comprise microphone inputs corresponding to microphone inputs 52 that may generate a beam based on microphone signals (e.g., $x_1$, $x_2$) received by such inputs. Speech beamformer 54 may be configured to form a beam to spatially filter audible sounds from microphones 51 coupled to microphone inputs 52. In some embodiments, speech beamformer 54 may comprise a unidirectional beamformer configured to form a respective unidirectional beam in a desired look direction to receive and spatially filter audible sounds from microphones 51 coupled to microphone inputs 52, wherein such respective unidirectional beam may have a spatial null in a direction opposite of the look direction. In some embodiments, speech beamformer 54 may be implemented as a time-domain beamformer. Speech beamformer 54 may be formed to capture most of the speech arriving from a speech acceptance direction while suppressing interfering noise coming from other directions.

Noise beamformer 55 may comprise microphone inputs corresponding to microphone inputs 52 that may generate a beam based on microphone signals (e.g., $x_1$, $x_2$) received by such inputs. Noise beamformer 55 may be configured to form a beam to spatially filter audible sounds from microphones 51 coupled to microphone inputs 52. In some embodiments, noise beamformer 55 may comprise a unidirectional beamformer configured to form a respective unidirectional beam in a desired look direction (e.g., different than the look direction of speech beamformer 54) to receive and spatially filter audible sounds from microphones 51 coupled to microphone inputs 52, wherein such respective unidirectional beam may have a spatial null in a direction opposite of the look direction. In some embodiments, noise beamformer 55 may be implemented as a time-domain beamformer. Similarly to speech beamformer 54, noise beamformer 55 may be formed to capture noise coming from a noise rejection direction while suppressing signals arriving from the speech acceptance direction.

Either or both of speech beamformer 54 and noise beamformer 55 may comprise a first-order beamformer.

Figure 8A:
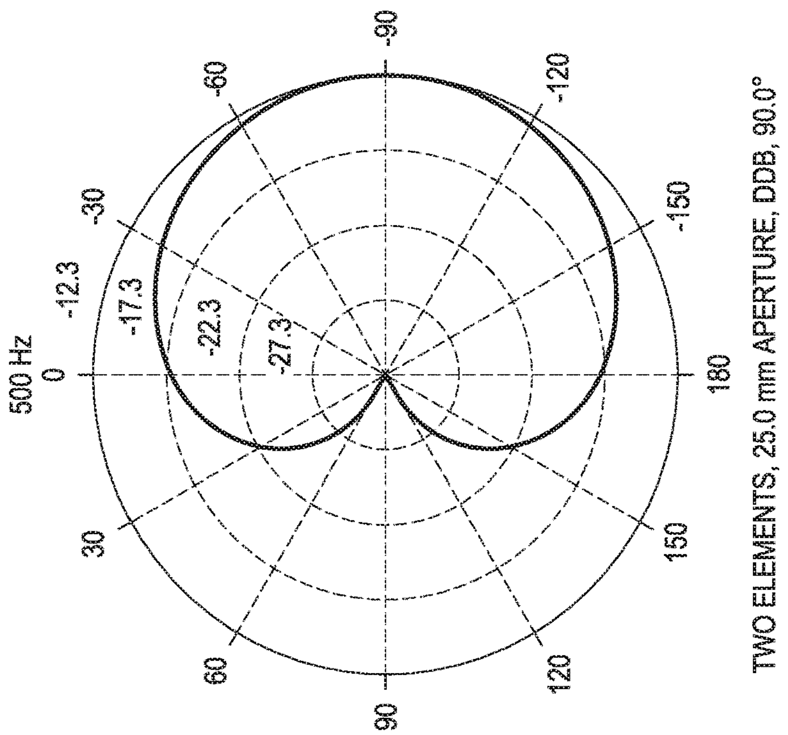
FIG. 8(*a*) illustrates an example speech beampattern for the speech beamformer 54 corresponding to the directional ranges shown in FIG. 7(*a*), in accordance with embodiments of the present disclosure.
Figure 8B:
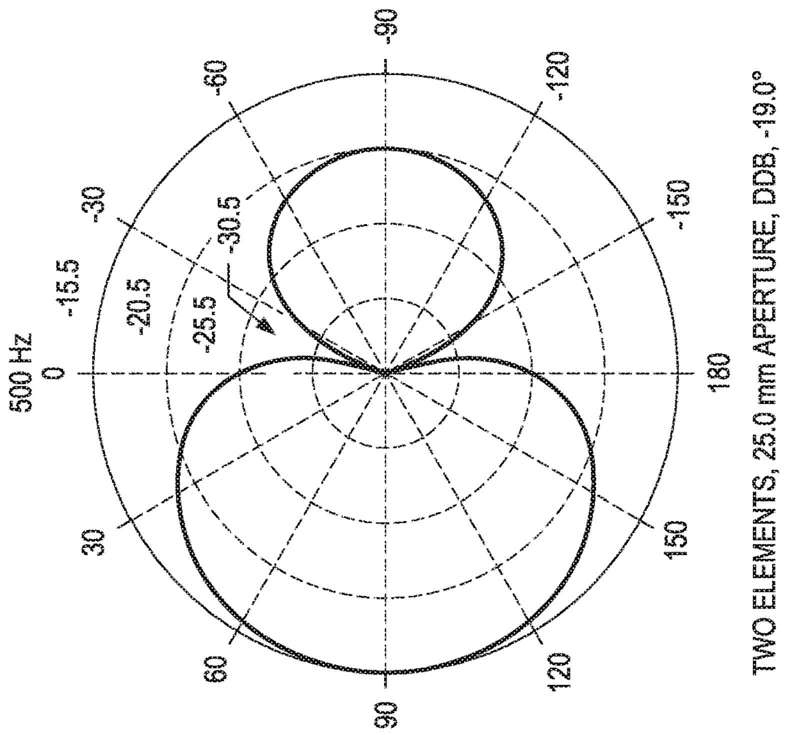
Figure 9A:
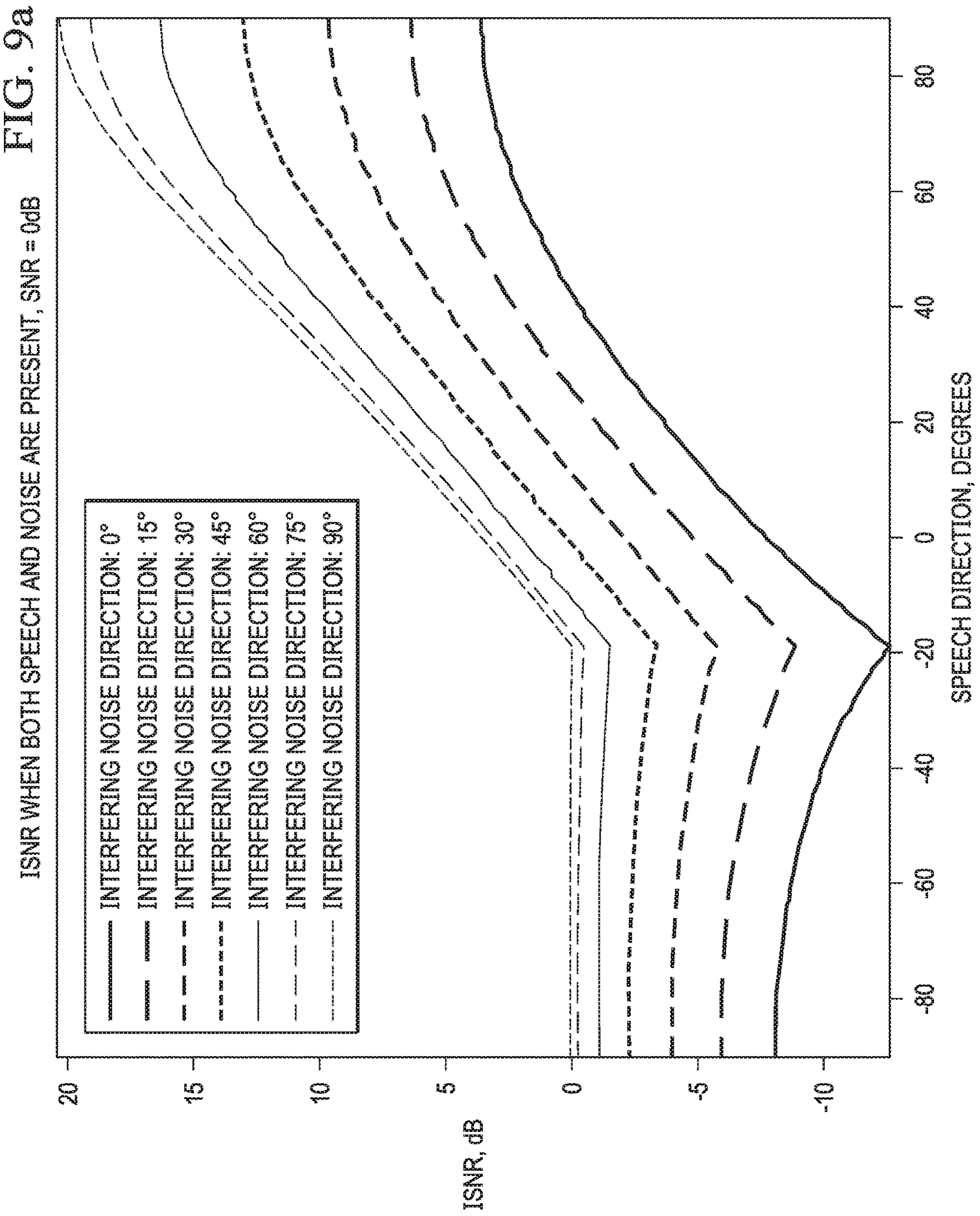
FIG. 9 illustrates example inverse signal-to-noise statistics for beamformer parameters at different signal-to-noise ratio conditions for directional interfering noise, in accordance with embodiments of the present disclosure.
Figure 9B:
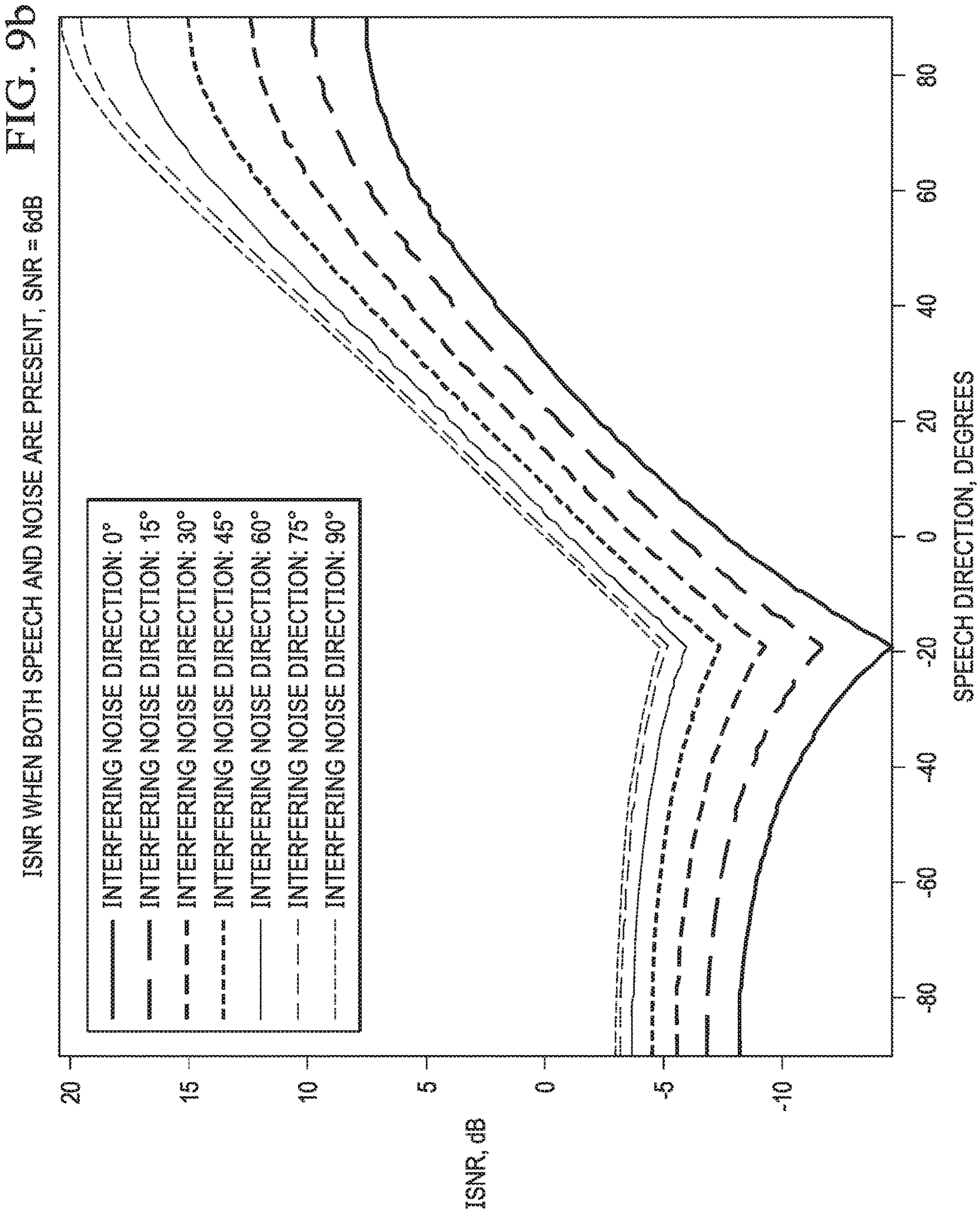
Figure 9C:
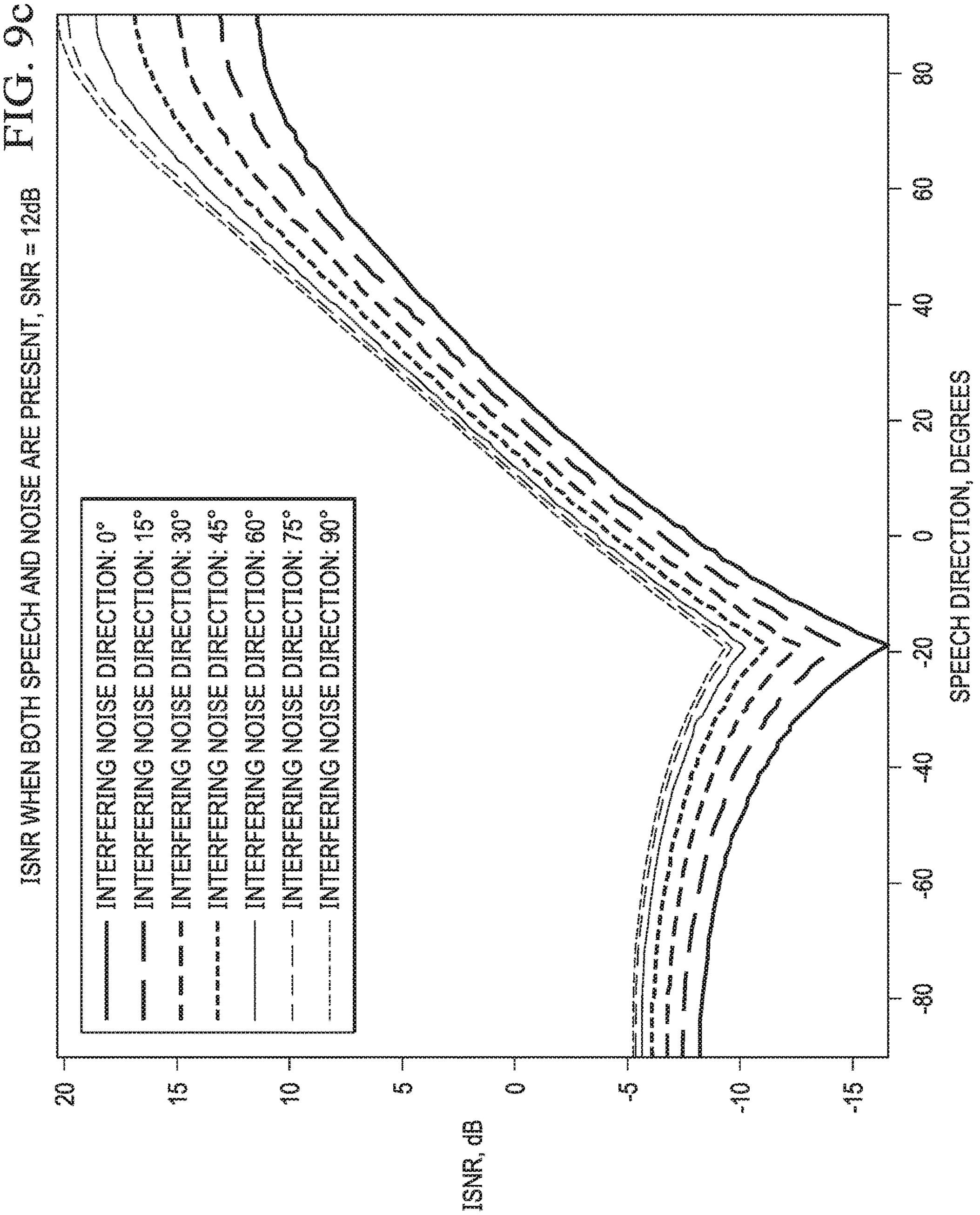
Figure 9D:
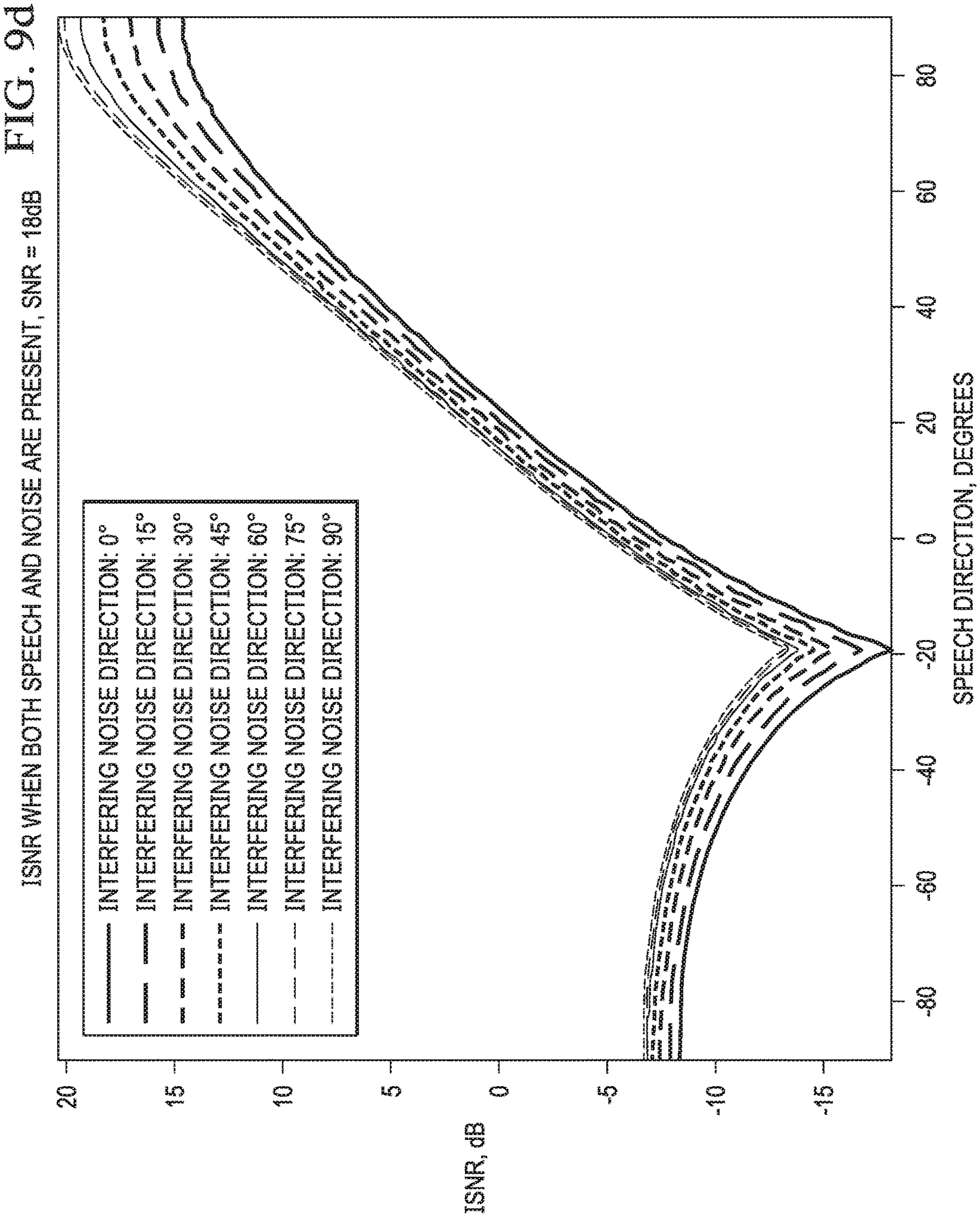

Each of the null directions for speech beamformer 54 and noise beamformer 55 may be chosen based on pre-specified speech acceptance and noise rejection direction ranges, respectively. FIG. 8(*a*) depicts an example speech beampattern for speech beamformer 54 and FIG. 8(*b*) depicts an example noise beampattern for noise beamformer 55 corresponding to the directional ranges shown in FIG. 7(*a*). The null directions for speech beamformer 54 and noise beamformer 55 may be fixed in order to not rely on a separate near-field detector. While dynamically adjusting the null directions may improve performance, in practice, performance may degrade significantly if error is introduced during the null direction estimation process. The output $y_s$ of speech beamformer 54 and the output $y_n$ of noise beamformer 55 may be given by:

$$y_s[n]=v_1^n[n]x_1[n]-v_2^n[n]x_2[n-n_s]$$

$$y_n[n]=v_1^n[n]v_1^s[n]x_1[n-n_n]-v_2^n[n]v_2^s[n]x_2[n]$$

where $v_1^s[n]$ and $v_2^s[n]$ are calibration gains compensating for near-field propagation loss effects and the calibrated values may be different for various headset positions. The gains $v_1^n[n]$ and $v_1^n[n]$ are the microphone calibration gains adjusted dynamically to account for microphone sensitivity mismatches. The delay $n_s$ of speech beamformer 54 and delay $n_n$ of noise beamformer 55 may be calculated as:

$$n_n = \frac{d\sin(\theta)}{cF_s},\ n_s = \frac{d\sin(\varphi)}{cF_s}$$

where d is the microphone spacing, c is the speed of sound, $F_s$ is a sampling frequency, φ is an expected direction of arrival of a most commonly present dominant interfering signal, and θ is the angle of arrival of the desired speech in a most prevailing headset position.

The instantaneous spatial statistics for an inverse signal-to-noise ratio may be computed as:

$$ISNR_{spatial,inst.}[m] = \frac{\overline{E_n}[m]}{\overline{E_s}[m]}$$

where m is a frame index, $\overline{E_n}$ and $\overline{E_s}$ are a smoothed noise beamformer output energy and smoothed speech beamformer output energy, respectively. The smoothed energies may be computed using a recursive averaging filter as:

$$\overline{E_i}[m]=(1-\alpha_{idr})\overline{E_i}[m-1]+\alpha_{idr}E_i[m],\ i=s,n$$

where $\alpha_{idr}$ is a smoothing constant and $E_i$[m] is an instantaneous frame energy. The energies may be computed based on sum of weighted squares. A weighted averaging method may provide better detection results when compared with a more inexpensive exponential averaging method. The weights may be assigned to provide more emphasis on a present frame of data and less emphasis on past frames. For example, weights for a present frame may be 1 and the weights for the past frames may follow a linear relation, (e.g., 0.25 for the oldest data and 1 for the latest data among the past frames). Thus, a weighted energy $E_i$(m) for a frame of data x[m,n] may be given by:

$$E_i[m] = \sum_{n=1}^{32} x^2[m, n] + (0.0079n + 0.7472)x^2[m-1, n] + (0.0079n + 0.4947)x^2[m-2, n] + (0.0079n + 0.2421)x^2[m-3, n]$$

where N is the number of samples in a frame and $y_i$[m,n] is a beamformer output. The instantaneous inverse signal-to-noise ratio may be further smoothed using a slow-attack/fast-decay approach, such as given by:

$$ISNR[m] = (1-\beta_{isnr})ISNR[m-1] + \beta_{isnr}ISNR_{spatial,inst.}[m]$$

where $$\beta_{isnr} = \begin{cases} \beta_{fast-decay}, & ISNR_{spatial,inst.}[m] < ISNR[m-1] \\ \beta_{slow-attack}, & ISNR_{spatial,inst.}[m] \geq ISNR[m-1] \end{cases}.$$

Figure 10:
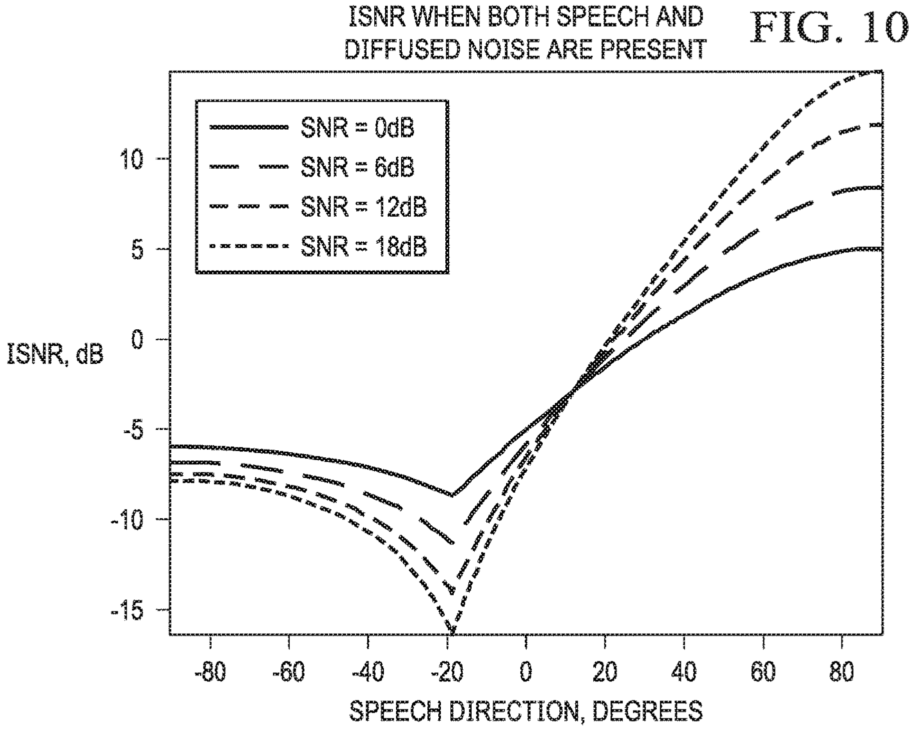
FIG. 10 illustrates example inverse signal-to-noise statistics under diffused noise conditions, in accordance with embodiments of the present disclosure.
Figure 11:
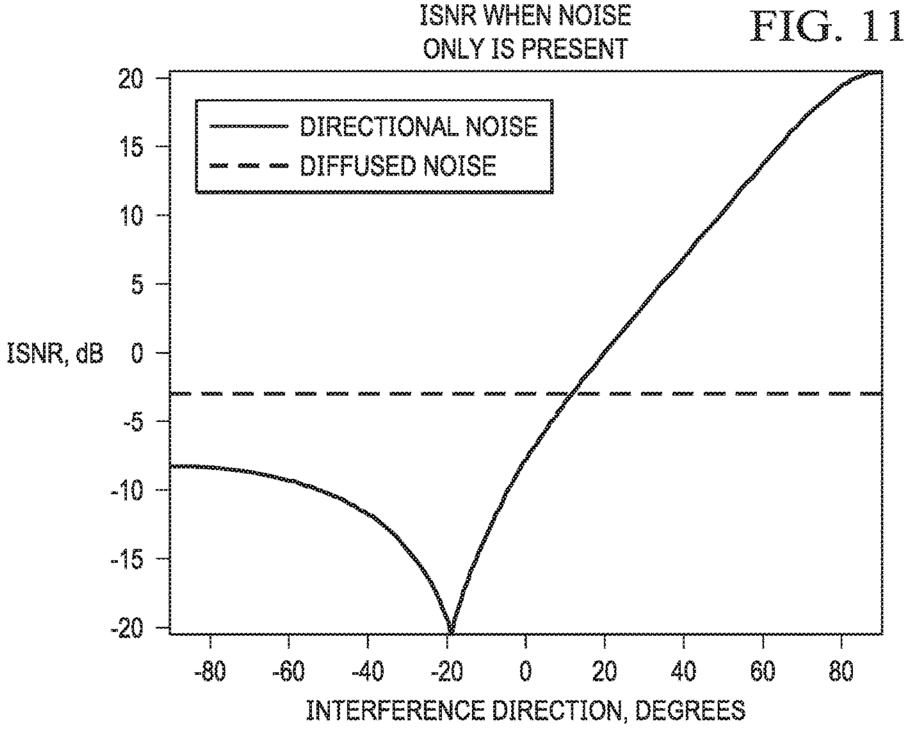
FIG. 11 illustrates example inverse signal-to-noise statistics when only noise is present, in accordance with embodiments of the present disclosure.

FIG. 9 illustrates example inverse signal-to-noise statistics for the above-mentioned beamformer parameters at different signal-to-noise ratio conditions for directional interfering noise, in accordance with embodiments of the present disclosure. A value of inverse-signal-to noise ratio ISNR may be low in the speech acceptance direction range implying that one could set a threshold below which it is assured that the desired speech is present. A similar phenomenon is shown in FIG. 10 under diffused noise conditions. FIG. 11 depicts inverse signal-to-noise ratio ISNR when noise only is present. Thus, a threshold may be optimally set by observing the inverse signal-to-noise ratio statistics for noisy speech and a noise-only signal. If desired speech arrives from the noise rejection direction, then the desired speech will be suppressed by the described systems and methods. On the other hand, if an interfering noise arrives from the speech acceptance direction, then the interfering noise will not be suppressed. Therefore, the speech preservation versus noise rejection trade-off must be judiciously made by properly setting the speech acceptance angle and noise rejection angle. A threshold value for inverse signal-to-noise ratio ISNR may in turn be set as a function of the pre-specified direction angles.

When an acoustic source is close to a microphone, a direct-to-reverberant signal ratio at the microphone is usually high. The direct-to-reverberant ratio usually depends on the reverberation time ($RT_{60}$) of a room/enclosure and/or other physical structures that are in the path between the near-field source and the microphone. When the distance between the source and the microphone increases, the direct-to-reverberant ratio decreases due to propagation loss in the direct path, and the energy of reverberant signal will be comparable to the direct path signal. This concept provides a statistic that may indicate the presence of a near-field signal that is robust to an array position. A cross-correlation sequence between microphones 51 may be computed as:

$$r_{x1x2}[m] = \frac{1}{N}\sum_{n=0}^{N-1} x_1[n]x_2[n-m]$$

Wherein range of $$m:\ \left[\text{ceil}\left(\frac{d}{c}F_s\right),\right.$$

floor $$\left.\left(\frac{d}{c}F_s\right)\right].$$

A maximum normalized correlation statistic may be computed as:

$$\tilde{\gamma} = \max_{\forall m}\left\{\frac{r_{x1x2}[m]}{\sqrt{E_{x1}E_{x2}}}\right\}$$

where $E_{xi}$ corresponds to microphone signal energy of the $i^{th}$ microphone energy. This statistic is further smoothed to get $$\gamma[n]=\delta_\gamma\gamma[n-1]+(1-\delta_\gamma)\tilde{\gamma}[n]$$

where $\delta_\gamma$ is a smoothing constant.

A spatial resolution of the cross-correlation sequence may be increased by interpolating the cross-correlation sequence using the Lagrange interpolation function. A direction of arrival (DOA) statistic may be estimated by selecting a lag corresponding to a maximum value of the interpolated cross-correlation sequence, $\tilde{r}_{x1x2}[m]$:

$$l_{max} = \underset{\forall m}{\text{argmax}}\{\tilde{r}_{x1x2}[m]\}$$

The selected lag index may then be converted into an angular value by using the following formula:

$$\theta = \sin^{-1}\left(\frac{cl_{max}}{dF_r}\right)$$

where $F_r=rF_s$ is an interpolated sampling frequency and r is an interpolation rate. To reduce the estimation error due to outliers, the direction of arrival estimate may be median filtered to provide a smoothed version of a raw direction of arrival estimate. In some embodiments, a median filter window size may be set at three estimates.

A technique known as spectral subtraction may be used to reduce noise in an audio system. If s[n] is a clean speech sample corrupted by an additive and uncorrelated noise sample n[n], then a noisy speech sample x[n] may be given by:

$$x[n]=s[n]+n[n].$$

Because x[n] and n[n] are uncorrelated, a discrete power spectrum of the noisy speech $P_x[k]$ may be given by:

$$P_{\cdot}[k]=P_{\cdot}[k]+P_{\cdot\cdot}[k]$$

where $P_s[k]$ and the $P_n[k]$ are the discrete power spectrum of speech and the discrete power spectrum of noise, respectively.

If the discrete power spectral density (PSD) of the noise source is completely known, it may be subtracted from the noisy speech signal using what is known as a Wiener filter solution in order to produce clean speech. Specifically:

$$P_{\cdot}[k]=P_{\cdot}[k]-P_{\cdot\cdot}[k].$$

A frequency response H[k] of the above subtraction process may be written as $$H[k] = \sqrt{\frac{P_x[k]-P_n[k]}{P_x[k]}}.$$

Typically, a noise source is not known, so the crux of a spectral subtraction algorithm is the estimation of power spectral density of the noise. For a single microphone noise reduction solution, the noise is estimated from the noisy speech, which is the only available signal. The noise estimated from noisy speech thus may not be accurate. Therefore, a system may need to perform adjustment to spectral subtraction in order to reduce speech distortion resulting from inaccurate noise estimates. For this reason, many spectral subtraction based noise reduction methods introduce a parameter that controls the spectral weighting factor, such that frequencies with low signal-to-noise ratio are attenuated and frequencies with high signal-to-noise ratio are not modified. The frequency response above may be modified as:

$$H[k] = \sqrt{\frac{P_x[k]-\beta\hat{P}_n[k]}{P_x[k]}}.$$

where $\hat{P}_n[k]$ is the power spectrum of the noise estimate, and β is a parameter which controls a spectral weighting factor based on a sub-band signal. The response H[k] above may be used in a weighting filter. A clean speech estimate Y[k] may be obtained by applying the response H [k] of the weighting filter to the Fourier transform of the noisy speech signal X[k], as follows:

$$Y[k]=X[k]H[k].$$

Figure 12:
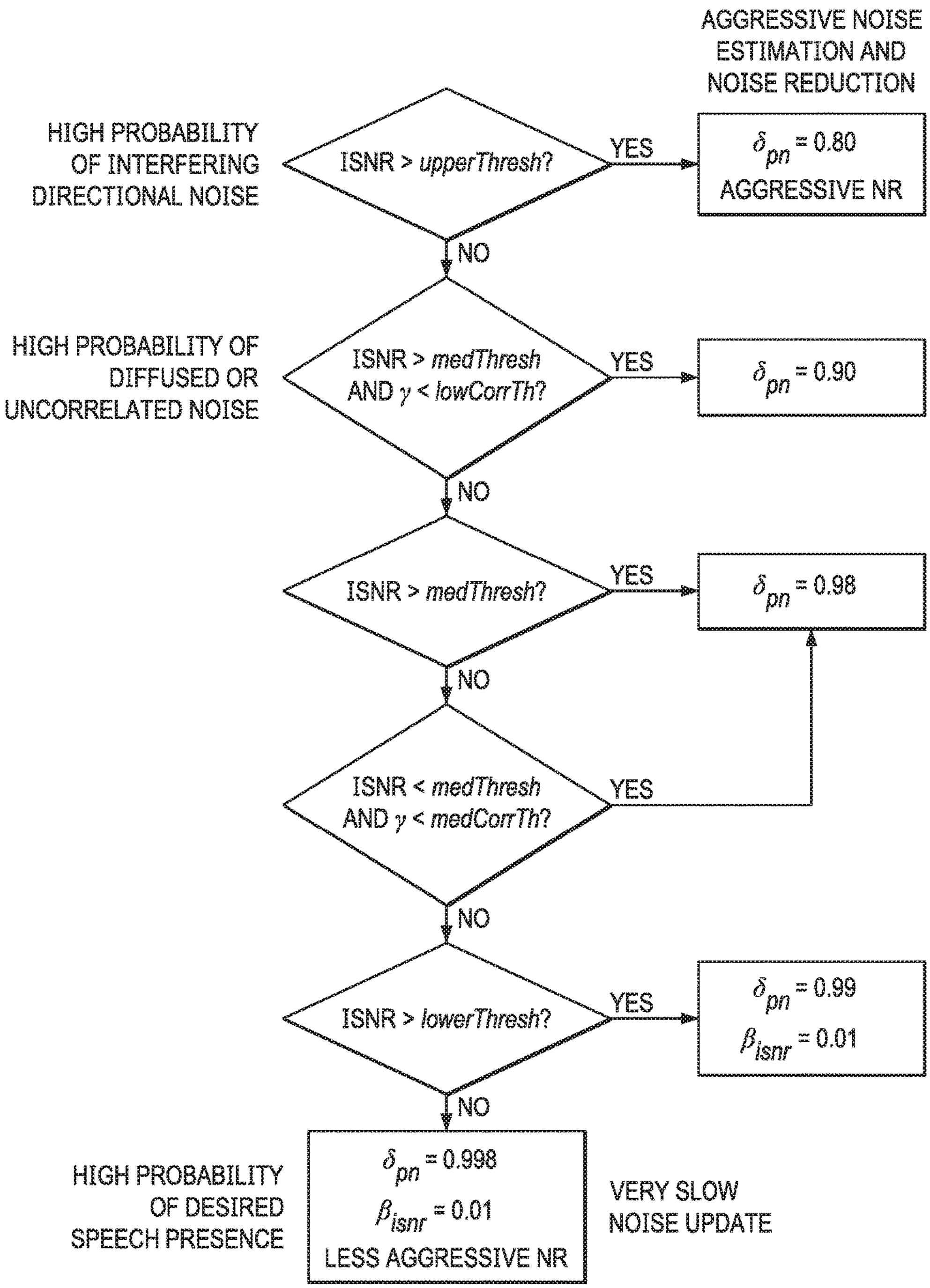
FIG. 12 illustrates a flow chart depicting use of spatial statistics to control an update rate of a recursive averaging filter to reduce effects of under-biased noise estimation, in accordance with embodiments of the present disclosure.

The various spatial statistics described above may be used by audio device 50 as a powerful aid to augment single-channel noise reduction techniques similar to spectral subtraction described above. Such spatial statistics provide information regarding the likelihood of desired speech and noise-only presence conditions. For example, such information may be used in a binary approach to update the background noise whenever a noise-only presence condition is detected. Similarly, the background noise estimation may be frozen if there is a high likelihood of desired speech presence. Further, instead of using such binary approach, audio device 50 may use a multiple state discrete signaling approach to obtain maximum benefits from the spatial statistics by accounting for noise level fluctuations. Specifically, what is known as a modified Doblinger noise estimate may be augmented by audio device 50 with the spatial statistics as further described below. A modified Doblinger noise estimate may be given by:

$$\hat{P}_n[m,k] = \begin{cases} P_x[m,k], & P_x[m,k] \le \hat{P}_n[m,k] \\ \delta_{pn}\hat{P}_n[m-1,k] + (1-\delta_{pn})P_x[m,k], & \text{otherwise} \end{cases}$$

where $\hat{P}_n[m,k]$ is a noise spectral density estimate at spectral bin k, $P_x[m,k]$ is a power spectral density of noisy signal and $\delta_{pn}$ is a noise update rate that controls the rate at which the background noise is estimated. A minimum statistic condition in the above update equation may render the noise estimate under-biased at all times. This under-biased noise estimate may introduce musical artifacts during the noise reduction process. FIG. 12 illustrates a flow chart showing how audio device 50 may use the spatial statistics to control the update rate of a recursive averaging filter to reduce effects of under-biased noise estimation. The Steps of FIG. 12 may be implemented using background noise estimator 68 depicted in FIG. 6.

As shown in FIG. 12, audio device 50 may apply aggressive noise estimation and noise reduction when the inverse signal-to-noise ratio ISNR is above an upper threshold upperThresh, indicating a high probability of interfering directional noise. Less aggressive noise estimation and reduction may be applied when statistics indicate a high probability of diffused or uncorrelated noise (e.g., inverse signal-to-noise ratio ISNR is below the upper threshold upperThresh but above a medium threshold medThresh and the correlation y is below a low correlation threshold lowCorrTh). Even less noise estimation and reduction may be applied when inverse signal-to-noise ratio ISNR is above a medium threshold medThresh. Even less aggressive noise estimation and noise reduction may be performed when inverse signal-to-noise ratio ISNR is below the medium threshold medThresh but above a lower threshold lowThresh and the correlation y is below a medium correlation threshold medCorrTh. Finally, when a high probability of desired speech is present (e.g., when inverse signal-to-noise ratio ISNR is below the lower threshold lowThresh), audio device 50 may perform very slow noise updating.

The performance of the spatially-controlled noise reduction algorithm described herein may be improved if the background noise in microphone signal $x_1$ is reduced. Such background noise reduction may be performed via an adaptive filter architecture implemented by nullformer 60, adaptive filter 74, and combiner 72. Given two microphone signals $x_1$ and $x_2$, the adaptive architecture implemented by nullformer 60, adaptive filter 74, and combiner 72 may generate a background noise signal that is closely matched (in a mean square error sense) with the background noise present in one of the microphone signals. Adaptive nullformer 60 may generate a reference signal to adaptive filter 74 by combining the two microphone signals $x_1$ and $x_2$ such that the desired speech signal leakage in the reference signal is minimized to avoid speech suppression during the background noise removal process. Specifically, to obtain the reference signal, adaptive nullformer 60 may have a null focused towards the desired speech direction. However, unlike fixed noise beamformer 55, the null for adaptive nullformer 60 may be dynamically modified as a desired speech direction is modified. Combiner 72 may remove the background noise signal generated by adaptive filter 74 from microphone signal $x_1$.

Figure 13:
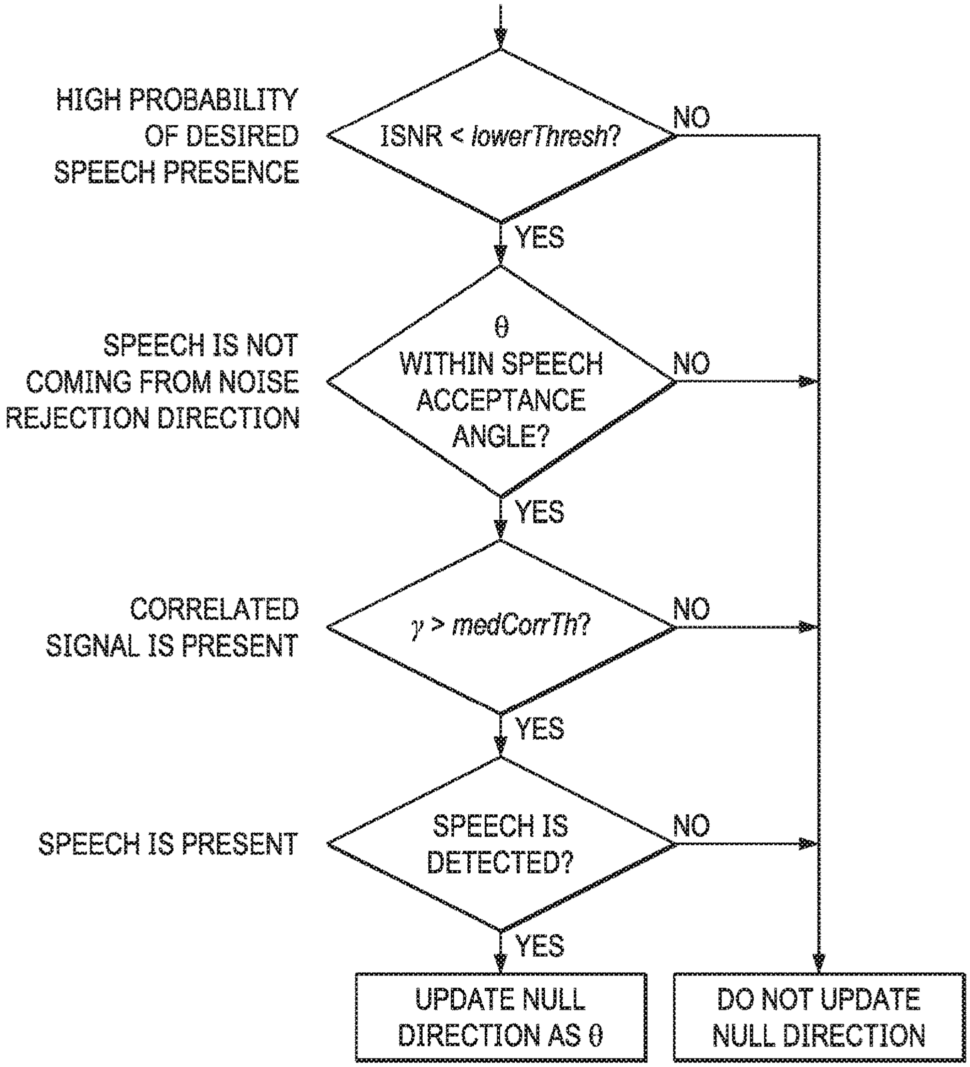
FIG. 13 illustrates a flow chart depicting a method for updating a null direction of an adaptive nullformer, in accordance with embodiments of the present disclosure.

VAD and system controls block 70 may track the desired speech direction as shown in FIG. 13. As shown in FIG. 13, if a high probability of desired speech presence exists (e.g., as indicated by inverse signal-to-noise ratio ISNR being below the lower threshold lowerThresh), speech is not coming from the noise rejection direction (e.g., as indicated by the direction of arrival θ being within the speech acceptance angle), a correlated signal is present (e.g., as indicated by correlation y being above the medium correlation threshold medCorrTh), and speech is detected, the null direction of adaptive nullformer 60 may be updated to the current direction of arrival θ determined by direction of arrival estimator 56. Otherwise, if one or more of the above conditions are not met, the null direction of adaptive nullformer 60 may not be updated. In addition, to reduce the likelihood of audio artifacts, the updated null direction may be applied to adaptive nullformer 60 only when the updated direction exceeds from the current null direction by a certain value.

Speech leakage that may arise from false tracking of a desired speech direction may induce speech suppression in adaptive filter 74. The effects of poor desired speech detection in high noise may be mitigated by ensuring that coefficients of adaptive filter 74 are not updated whenever a speech signal is detect by VAD and system controls 70. Logic inverse to that shown in FIG. 13 may be used by VAD and system controls 70 to control adaptation of the coefficients of adaptive filter 74, thus potentially rendering adaptive filter 74 less sensitive to speech leakage.

Voice activity detection may be performed by VAD and system controls 70 based on an output of speech beamformer 54. Speech beamformer 54 thus helps in improving input signal-to-noise ratio for the voice activity detector, thus increasing the speech detection performance in noisy conditions while reducing the false alarms from competing speech like interference arriving from the noise rejection direction. Any suitable approach may be used for detecting the presence of speech in a given input signal, as is known in the art.

The inverse signal-to-noise ratio ISNR as shown in FIG. 9 may exhibit a wider dynamic range as a function of noise level. In order to avoid speech suppression, the comparison thresholds (e.g., upperThresh, medThresh, lowerThresh) for inverse signal-to-noise ratio ISNR described above may be set at fixed values matched for worst-case noise level scenarios. Such fixed thresholding approach will result in less noise rejection when the actual noise level is less than worst case conditions. However, noise rejection performance may be improved by employing a dynamic thresholding scheme wherein thresholds are adjusted as a function of noise level.

Figure 14:
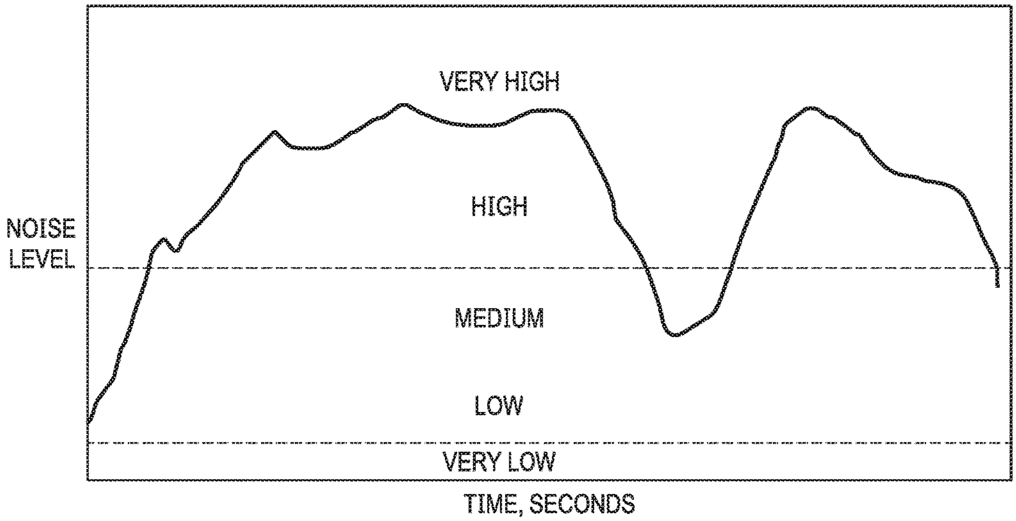
FIG. 14 illustrates an example graph depicting the mapping of different noise levels to various noise modes, in accordance with embodiments of the present disclosure.

The noise beam signal energy E[m] may be used as background noise level estimate. The instantaneous energy may be smoothed further using a recursive averaging filter to reduce the variance of the noise level estimate. The measured noise level may be split into five different noise levels, namely, very-low, low, medium, high and very-high noise levels. As shown in FIG. 14, the noise level may be mapped into five different noise modes by using four noise level thresholds.

In order to avoid frequent noise mode state transitions, the instantaneous noise modes from past history may be used to derive a slow varying noise mode. The discrete noise mode distribution may be updated every frame based on instantaneous noise mode values from current and past frames. The noise mode that occurred most frequently is chosen as the current noise mode. For example, if the noise mode distribution for the past 2000 frames consists of very-low—10 frames, low—500 frames, medium—900 frames, high—500 frames, very-high—90 frames, then the current noise mode may be set to medium.

Accordingly, the inverse signal-to-noise ratio ISNR thresholds upperThresh, medThresh and lowerThresh may be dynamically adjusted based on the noise mode as follows:

$$\text{dyn[upper|med|lower]Thresh} = \text{[upper|med|lower]Thresh} + \text{[upper|med|lower]ThresOffset}[i],$$
$$i = \text{Very-low, low, medium, high, very-high}$$

where the offset values for the thresholds may be determined empirically and may be tuned as a function of desired speech acceptance and noise rejection direction ranges. Similarly, the maximum achievable noise reduction limit in each spectral bin may be dynamically adjusted to maintain good trade-off between noise reduction and speech suppression. For example, in extremely high noise conditions, it is preferable to have less noise reduction while preserving the speech. Spectral subtraction algorithms in general, suppress speech in extremely high noise conditions since the SNR is low at all frequency bins. Similarly, to noise reduce residual noise artifacts, the spectral subtraction based gain calculation may be substituted by a linear attenuation function at low/medium noise conditions if the spatial statistics points to high likelihood of noise only conditions, as shown in U.S. Pat. No. 7,454,010, which is incorporated herein by reference.

The foregoing describes systems and methods for implementing a robust dual microphone based non-linear beamforming technique that is robust to changes in array position with respect to a user's mouth. The technique provides tuning flexibility wherein the speech acceptance and noise rejection direction may be intuitively controlled by appropriate thresholds. In addition, the proposed technique may be easily modified to be used in a headset with a fixed desired speech direction. The performance of the technique may be further improved if a robust near-field detector may be augmented with the non-linear beamformer described herein. The performance of the technique may be further improved if a robust near-field detector, such as that disclosed in U.S. patent application Ser. No. 15/584,347 and incorporated herein by reference, is augmented with a proposed non-linear beamformer method.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

What is claimed is:

1. A method for voice processing in an audio device having an array of a plurality of microphones wherein the array is capable of having a plurality of positional orientations relative to a user of the array, the method comprising:
- determining a desired speech estimate originating from a speech acceptance direction range of a speech acceptance direction while reducing a level of interfering noise;
- determining an interfering noise estimate originating from a noise rejection direction range of a noise rejection direction while reducing a level of desired speech;
- calculating a ratio of the desired speech estimate to the interfering noise estimate;
- dynamically computing a set of thresholds based on the speech acceptance direction range, noise rejection direction range, a background noise level, and a noise type;
- estimating a power spectral density of background noise arriving from the noise rejection direction range;
- calculating a frequency-dependent gain function based on the power spectral density of background noise and thresholds; and
- applying the frequency-dependent gain function to at least one microphone signal generated by the plurality of microphones to reduce noise arriving from the noise rejection direction while preserving desired speech arriving from the speech acceptance direction.

2. The method of claim 1, wherein calculating the frequency-dependent gain function comprises setting one or more coefficients of the frequency-dependent gain function based on a comparison of the ratio to one of the thresholds.

3. The method of claim 1, wherein calculating the frequency-dependent gain function comprises setting one or more coefficients of the frequency-dependent gain function based on a comparison of a cross-correlation between microphone signals generated by the plurality of microphones to one of the thresholds.

4. The method of claim 1, wherein calculating the frequency-dependent gain function comprises setting one or more coefficients of the frequency-dependent gain function based on a direction of arrival estimate for desired speech.

5. The method of claim 1, wherein the noise type comprises one of directional noise, diffused noise, and uncorrelated noise.

6. The method of claim 1, further comprising dynamically adjusting the set of thresholds based on ambient noise conditions.

7. The method of claim 1, further comprising adjusting the maximum noise reduction limit based on ambient noise conditions.

8. The method of claim 1, further comprising:
computing the ratio at separate frequencies; and
adjusting the power spectral density of the background noise separately as a function of a computed frequency-dependent ratio for each of the separate frequencies.

9. The method of claim 1, further comprising modifying the set of thresholds as a function of speech acceptance direction range and noise rejection direction range.

10. The method of claim 1, further comprising controlling the null direction of a spatially-controlled adaptive nullformer based on the ratio.

11. The method of claim 10, wherein an output of the spatially-controlled adaptive nullformer is used as a reference signal for an adaptive noise reduction filter.

12. An integrated circuit for implementing at least a portion of an audio device having an array of a plurality of microphones wherein the array is capable of having a plurality of positional orientations relative to a user of the array, comprising:
a plurality of microphone inputs, each microphone input associated with one of the plurality of microphones;
a processor configured to:
determine a desired speech estimate originating from a speech acceptance direction range of a speech acceptance direction while reducing a level of interfering noise;
determine an interfering noise estimate originating from a noise rejection direction range of a noise rejection direction while reducing a level of desired speech;
calculate a ratio of the desired speech estimate to the interfering noise estimate;
dynamically compute a set of thresholds based on the speech acceptance direction range, noise rejection direction range, a background noise level, and a noise type;
estimate a power spectral density of background noise arriving from the noise rejection direction range;
calculate a frequency-dependent gain function based on the power spectral density of background noise and thresholds; and
apply the frequency-dependent gain function to at least one microphone signal generated by the plurality of microphones to reduce noise arriving from the noise rejection direction while preserving desired speech arriving from the speech acceptance direction.

13. The integrated circuit of claim 12, wherein calculating the frequency-dependent gain function comprises setting one or more coefficients of the frequency-dependent gain function based on a comparison of the ratio to one of the thresholds.

14. The integrated circuit of claim 12, wherein calculating the frequency-dependent gain function comprises setting one or more coefficients of the frequency-dependent gain function based on a comparison of a cross-correlation between microphone signals generated by the plurality of microphones to one of the thresholds.

15. The integrated circuit of claim 12, wherein calculating the frequency-dependent gain function comprises setting one or more coefficients of the frequency-dependent gain function based on a direction of arrival estimate for desired speech.

16. The integrated circuit of claim 12, wherein the noise type comprises one of directional noise, diffused noise, and uncorrelated noise.

17. The integrated circuit of claim 12, wherein the processor is further configured to dynamically adjust the set of thresholds based on ambient noise conditions.

18. The integrated circuit of claim 12, wherein the processor is further configured to adjust the maximum noise reduction limit based on ambient noise conditions.

19. The integrated circuit of claim 12, wherein the processor is further configured to:
compute the ratio at separate frequencies; and
adjust the power spectral density of the background noise separately as a function of a computed frequency-dependent ratio for each of the separate frequencies.

20. The integrated circuit of claim 12, wherein the processor is further configured to modify the set of thresholds as a function of speech acceptance direction range and noise rejection direction range.

21. The integrated circuit of claim 12, wherein the processor is further configured to control the null direction of a spatially-controlled adaptive nullformer based on the ratio.

22. The integrated circuit of claim 21, wherein an output of the spatially-controlled adaptive nullformer is used as a reference signal for an adaptive noise reduction filter.

* * * * *